United States Patent [19]

Wicks

[11] 4,422,252
[45] Dec. 27, 1983

[54] DATA STORAGE CARDS AND METHOD OF HANDLING THEREOF

[75] Inventor: Anthony J. Wicks, Baughurst, Nr. Basingstoke, England

[73] Assignee: Wicks and Wilson Limited, Basingstoke, England

[21] Appl. No.: 258,292

[22] Filed: Apr. 28, 1981

[30] Foreign Application Priority Data

Feb. 18, 1981 [GB] United Kingdom ............... 8105088

[51] Int. Cl.³ .............................................. A47G 1/06
[52] U.S. Cl. .................................... 40/159; 156/584; 40/158 A; 40/158 B
[58] Field of Search ......... 156/584; 40/158 A, 158 B, 40/159

[56] References Cited

U.S. PATENT DOCUMENTS

| 4,216,048 | 8/1980 | Gehweiler | 156/344 |
| 4,249,328 | 2/1981 | Plumadore | 40/158 B |
| 4,285,759 | 8/1981 | Allen et al. | 156/584 |
| 4,292,115 | 9/1981 | Jones et al. | 156/502 |
| 4,334,945 | 6/1982 | Raush | 156/344 |

Primary Examiner—G. Z. Rubinson
Assistant Examiner—Robert Lev
Attorney, Agent, or Firm—Cushman, Darby & Cushman

[57] ABSTRACT

A data storage card has an aperture for receiving a photographic image. The aperture has an adhesive border which is protected by a disposable sheet having release characteristics. One edge of the sheet extends outwardly to form a flap overlying the card. By bending the card, for example, the flap can easily be separated from the card and a knife edge inserted to strip the sheet from the card.

12 Claims, 6 Drawing Figures

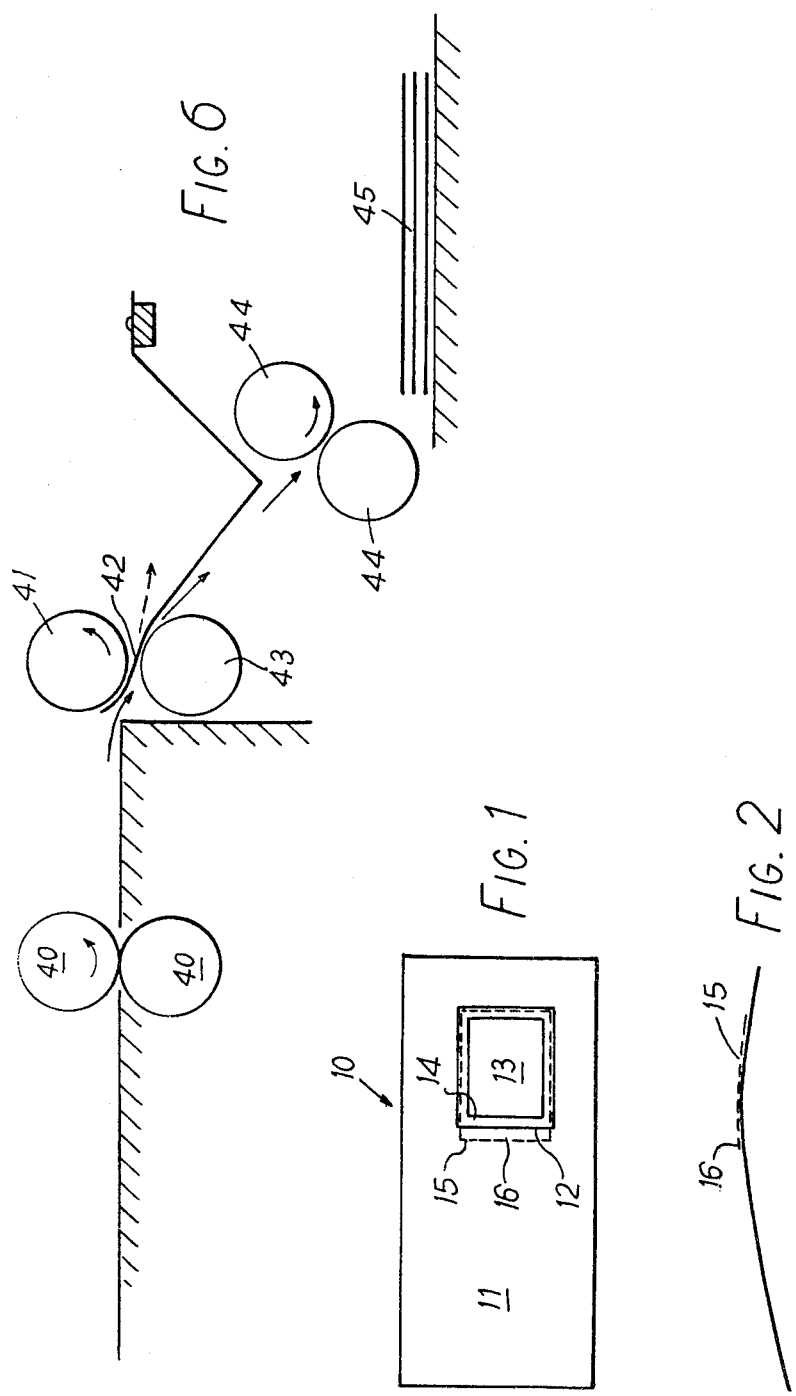

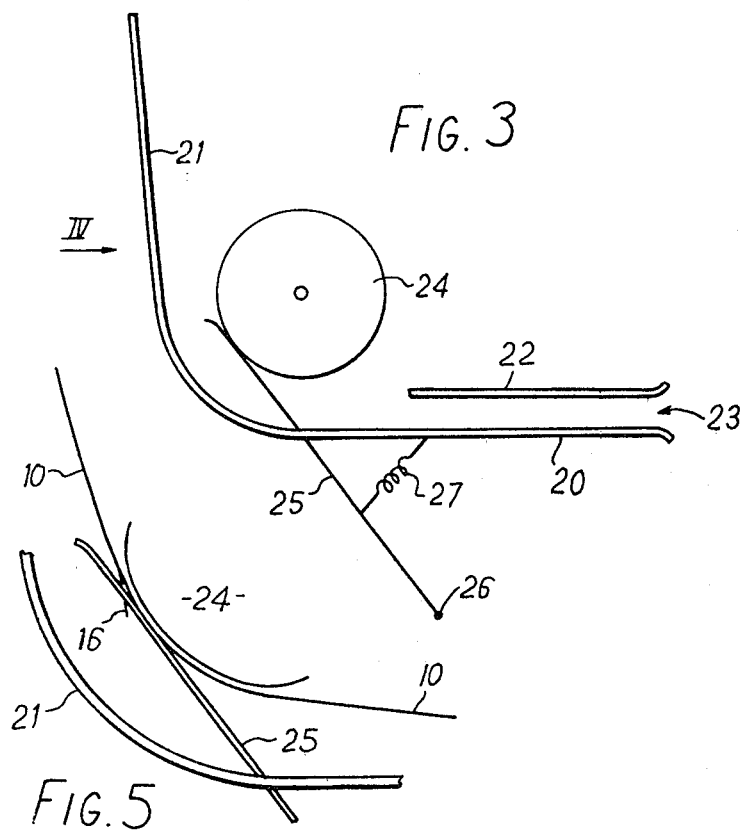
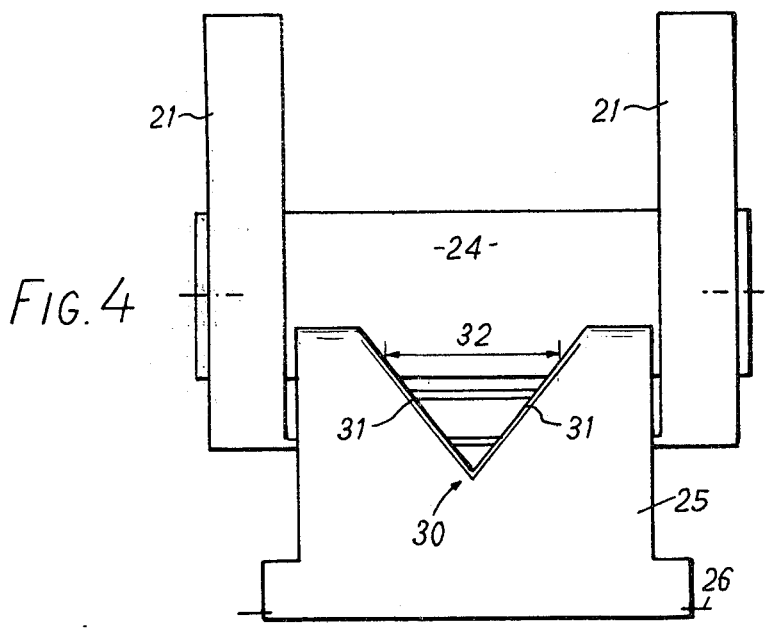

DATA STORAGE CARDS AND METHOD OF HANDLING THEREOF

BACKGROUND OF THE INVENTION

This invention relates to data storage cards having an aperture for receiving a photographic image (also known as microfilm "aperture cards").

Such data storage cards are well known, having an aperture which has at least in part an adhesive border protected by a disposable sheet which is mounted on said border but which has release characteristics which allow it to be removed. The function of the sheet is to protect the adhesive qualities of the border, so that immediately after removal, a photographic transparency, for example a microfilm copy of documents, can be immediately adhered to the border.

It has always proved an irritating problem that the disposable sheet must be removed by hand, usually by a sharp flick of the finger. Sometimes, the sheet tears; sometimes the card or the adhesive tape which projects into the aperture tears; and in any event the process requires individual manual handling of each card. Some machines have been built in an attempt to perform this operation automatically, but they have seldom proved satisfactory.

SUMMARY OF THE INVENTION

The invention aims to provide an improved data storage card which allows machine removal of the disposable sheet. Accordingly, the invention provides a data storage card having an aperture for receiving a photographic image, which aperture has at least in part an adhesive border protected by a disposable sheet which is mounted on said border but has release characteristics in relation thereto, wherein at one or more sides of the aperture the sheet extends outwardly of the aperture to form an un-adhered flap overlying the card.

Further, the invention proposes a method of preparing a data storage card for mounting an image in an aperture thereof by removal of a disposable sheet which protects an adhesive border of the aperture, comprising the step of spatially separating an un-adhered edge flap of the sheet from the card, inserting a knife edge between the flap and the card, and thereafter stripping the sheet from the adhesive border. Preferably, the card is moved by hand or automatically past the knife to effect the stripping. The separating of the edge flap of the sheet from the card is most simply effected by bending the card.

Moreover, the invention also proposes an apparatus for preparing a data storage card for mounting an image in an aperture thereof by removal of a disposable sheet which protects an adhesive border of the aperture, comprising a path along which said card can pass, means for causing an un-adhered edge flap of the sheet to spatially separate from the card, and a knife edge positioned so as to come between the flap and the card whereby the former is stripped from the latter. Preferably, the separation of the flap of the sheet from the card is achieved by curvature of the path along which the card passes with the sheet radially outwards.

BRIEF DESCRIPTION OF THE DRAWINGS

In order that the invention shall be more easily understood some exemplary embodiments thereof will now be described with reference to the accompanying drawings, in which:

FIG. 1 shows a plan view of a data storage card according to the invention;

FIG. 2 shows a side view of this card curved along its length;

FIG. 3 shows a schematic view of a first apparatus for stripping the disposable sheet from the card;

FIG. 4 shows a view in the direction of arrow IV in FIG. 3;

FIG. 5 shows an enlarged view of the stripping operation about to occur; and

FIG. 6 shows a continuous machine for stripping the disposable sheets from data storage cards.

DESCRIPTION OF THE PREFERRED EMBODIMENTS

FIG. 1 shows an aperture card 10, having as conventional, an area 11 intended to receive punched holes which allows automatic processing, and an aperture bordered by the line 12 within which is to be mounted a photographic transparency such as a microfilm carrying large quantities of written data. Within the edge of the aperture 13 is a border of transparent adhesive tape. The adhesive surface of this border is protected from dust and drying until it is required for use by a thin sheet of disposable material, such as glassene which has release characteristics in relation to the adhesive border. This sheet 15 is shown in dotted lines in FIG. 1. and it will be seen that it covers not just the aperture and its adhesive border, but in accordance with the invention on one side extends outwardly of the aperture to form an un-adhered flap 16 which overlies the surface of the card.

This new card makes use of the characteristics which are illustrated in FIG. 2. When curved longitudinally, it will be seen that the disposable sheet 15 maintains the same contour as the data card over almost its entire length where it is adhered to the adhesive border 14. However, the un-adhered flap 16 becomes separated from the card, and this allows easy removal of the sheet.

Apparatus for performing this removal is illustrated in the FIGS. 3,4 and 5. The apparatus is shown schematically, and it is presumed that the members shown are mounted between side plates which have been removed for clarity of explanation. A curved guide member 20 has upwardly projecting legs 21. An upper guide member 22 provides a slot-like opening 23. A roller 24 is mounted for rotation at the curve of the plate 20, and a light plate 25, pivotted at 26, is lighty biassed by spring 27 so as to bear against the surface of the roller 24. The plate 25 extends between the legs 21.

The plate 25 is formed with a V-shaped notch 30, each surface 31 of which is sharpened to form a knife edge. The width 32 of the notch 30 at the point where the plate 25 is a tangent to the roller 24 is just slightly smaller than the width of the un-adhered flap 16 of the new data storage card. The distance apart of the legs 21 is, moreover, smaller than the width of the whole data storage card 10.

In operation, a data storage card as previously described is slid manually onto the opening 23, with the aperture 13 leading. It pushes aside the plate 25 until the leading edge of the card meets the curved surface of the legs 21. Upon continued pressure, the card becomes progressively bent until it is curved around the surface of the roller 24. It must be pushed so far that the flap 16, lying on the radially outer surface of the card, has passed beyond the point of contact of the plate 25 with the roller 24. It can then be pulled back until the flap 16 just reaches the point of contact between the plate and the roller. This position is illustrated in FIG. 5.

Since the card 10 is curved, the flap 16 will be separated from the card as already described with reference to FIG. 2. As the card is pulled back downwards, the flap 16 passes between the knife edges 31 of the notch 30, and the knife edges proceed to strip the disposable sheet off the adhesive border 14. Continued withdrawal of the card causes continued stripping of the protective sheet from the aperture until it falls off completely. Thus, a simple insertion of the card into the apparatus and immediate withdrawal therefrom causes the desired results.

FIG. 6 shows apparatus for effecting removal of the protective sheet automatically from a continuous supply of cards fed to it. Cards are fed by rollers 40 to reach a deflector roller 41. The latter causes the card to be deflected downwards so that they pass beneath a stripping member 42 which is notched in precisely the same way as shown in FIG. 4. In this case, the card passes between the plate 42 and roller 43, following the line of the solid arrows. The protective sheet passes above the plate as shown by the broken arrow. The stripped card passes between feed rollers 44 to reach a stack 45.

While the initial separation of the flap 16 is clearly most easily achieved simply by bending the card, it is conceivable that other means might be used, for example an air blast or suction jet, or a sticky roller. Moreover, while sloping knife edges are evidently the simplest, a straight edge could also work efficiently.

The apparatus shown in FIGS. 3 and 4 can conveniently be mounted between vertical side plates which will stand on a table, a shelf also between the side plates serving to hold a supply of aperture cards ready to be used.

In the examples, a flap is shown at only one edge of the aperture, and that always the edge nearest the middle of the card. A flap may be provided however, at any edge, depending upon which way the data card is to be fed. For example, the card may be fed sideways, in which case the flap will need to be on a long edge of the aperture. Moreover, it may be advantageous to provide a flap on more than one edge, so that two or more feed directions would be equally possible. Further, the flap need not necessarily extend all along one edge, provided there is sufficient to perform the function described.

It will be understood that the above description of the present invention is susceptible to various modifications changes and adaptations.

I claim:

1. In a data storage card having an aperture for receiving a photographic image, said aperture having at least in part an adhesive border, and including a disposable sheet which protects said adhesive border and which is mounted on said border but has release characteristics in relation thereto, characterized in that at one or more sides of said aperture said sheet extends outwardly of said border to form an unadhered flap overlying said card, and said sheet is spaced from the edges of said card.

2. A data storage card as defined in claim 1 wherein said aperture is nearer to one edge of said card than to the edge opposite thereto, and the flap is at that side of said aperture closest to that opposite edge.

3. A data storage card as claimed in claim 1 wherein the adhesive border is transparent.

4. A method of preparing a data storage card for an operation, said data storage card having an aperture with an adhesive border, the border being protected by a disposable sheet spaced from the edges of the card, said sheet having at least one unadhered edge flap overlying said card, and said operation being the mounting of an image in said aperture, the steps comprising: spatially separating said unadhered edge flap of said sheet from said card; inserting a knife edge between said flap and said card; and thereafter stripping said sheet from said border by relative movement between said knife edge and said card.

5. A method as defined in claim 4, wherein said separating step is effected by bending said card with said sheet on the radially outer surface.

6. A method as defined in claim 5 wherein the card is manually pushed from one end between members positioned to deflect the card and thus cause said bending, and then pulled back to cause said insertion of said knife edge beneath said flap.

7. A method as claimed in claim 4 wherein the knife edge is inserted diagonally at a corner of the sheet.

8. A method as claimed in claim 7 wherein the card is caused to move past a sharpened V-shaped notch so that a knife edge is simultaneously inserted beneath both corners of the flap.

9. Apparatus for preparing a data storage card for mounting an image in an aperture thereof by removal of a disposable sheet which protects an adhesive border of the aperture and which has an unadhered edge flap which overlies said card, the sheet being spaced from the edges of said card, comprising means defining a path along which said card can pass; means for deflecting the card and causing bending thereof as it passes along the path with the sheet on the radially outer surface, whereby the edge flap spatially separates from said card; and a knife edge positioned along said path so as to come between said separated flap and said card, whereby said sheet is stripped from said card.

10. Apparatus as defined in claim 9 wherein the knife edge extends diagonally across said path.

11. Apparatus as defined in claim 10, wherein a knife blade extends across said path and includes a sharpened V-shaped notch forming two knife edges.

12. Apparatus as defined in claim 9 comprising driven rollers which allow cards to be moved automatically in succession along said path.

* * * * *